(12) United States Patent
Suttner et al.

(10) Patent No.: US 10,726,978 B2
(45) Date of Patent: Jul. 28, 2020

(54) FEED-THROUGHS FOR HIGH EXTERNAL PRESSURE APPLICATIONS AND METHOD FOR PRODUCING SAME

(71) Applicant: SCHOTT AG, Mainz (DE)

(72) Inventors: Jürgen Suttner, Marklkofen (DE); Thomas Fink, Landshut (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/112,255

(22) Filed: Aug. 24, 2018

(65) Prior Publication Data

US 2019/0006066 A1  Jan. 3, 2019

Related U.S. Application Data

(63) Continuation of application No. PCT/EP2017/054329, filed on Feb. 24, 2017.

(30) Foreign Application Priority Data

Feb. 26, 2016 (DE) .................. 10 2016 103 485

(51) Int. Cl.
  *H01B 17/30* (2006.01)
  *H01M 8/02* (2016.01)

(52) U.S. Cl.
  CPC ......... *H01B 17/306* (2013.01); *H01B 17/305* (2013.01); *H01M 8/02* (2013.01);
  (Continued)

(58) Field of Classification Search
  CPC .... H01B 17/306; H01B 17/303; H01B 17/00; H01B 17/305; H01B 17/56; H01M 2/06; H01M 2/065; H01M 2/08
  (Continued)

(56) References Cited

U.S. PATENT DOCUMENTS

| 4,213,004 A | 7/1980 | Acker |
| 4,792,503 A * | 12/1988 | Eppley ................. H01B 17/305 |
| | | 429/181 |

(Continued)

FOREIGN PATENT DOCUMENTS

| DE | 1490333 | 1/1969 |
| DE | 1665564 | 2/1971 |

(Continued)

OTHER PUBLICATIONS

English translation of the International Search Report dated May 2, 2017 from corresponding International Application No. PCT/EP2017/054329, 3 pages.

(Continued)

*Primary Examiner* — Angel R Estrada
(74) *Attorney, Agent, or Firm* — Ohlandt, Greeley, Ruggiero & Perle, L.L.P.

(57) ABSTRACT

A feed-through for high external pressure applications and methods of producing are provided. The feed-through includes a base body, a through-hole extending through the base body, and a functional element. The functional element is arranged inside the through-hole. The functional element is connected to the base body in fluid-tight manner with a pressure compensator and an insulating material that at least partially surrounds the functional element and establishes the fluid-tight connection. The pressure compensator increases pressure resistance of the fluid-tight connection of the functional element to the base body against pressure.

31 Claims, 10 Drawing Sheets

(52) U.S. Cl.
CPC .......... *H01M 2250/20* (2013.01); *Y02P 70/56* (2015.11); *Y02T 90/32* (2013.01)

(58) Field of Classification Search
USPC .......... 174/14 BH, 12 BH, 8, 11 BH, 17.05, 174/17.08, 17 VA, 17 CT, 18, 50.5, 650, 174/137 R, 138 R, 142, 152 R, 152 GM; 439/178, 181, 163
See application file for complete search history.

(56) References Cited

U.S. PATENT DOCUMENTS

| | | | |
|---|---|---|---|
| 4,797,117 A | | 1/1989 | Ayers |
| 5,861,577 A | | 1/1999 | Tamura |
| 6,076,017 A | * | 6/2000 | Taylor .................. A61N 1/3752 174/152 GM |
| 6,569,562 B1 | * | 5/2003 | Spillman ............... H01M 2/065 429/181 |
| 6,586,675 B1 | * | 7/2003 | Bealka ................. H01B 17/305 174/50.56 |
| 6,670,074 B2 | * | 12/2003 | Spillman ............... H01M 2/065 429/178 |
| 7,046,499 B1 | * | 5/2006 | Imani ....................... H01G 4/35 174/152 GM |
| 7,094,968 B2 | * | 8/2006 | Motzigkeit ............ H02G 3/088 174/659 |
| 7,690,936 B1 | | 4/2010 | Snekkevik |
| 8,487,187 B2 | * | 7/2013 | VandenEynden ...... H01B 17/30 174/152 GM |
| 2006/0179950 A1 | | 8/2006 | Rasmussen |
| 2010/0025104 A1 | | 2/2010 | Hartl |
| 2014/0099533 A1 | | 4/2014 | Hartl |

FOREIGN PATENT DOCUMENTS

| | | |
|---|---|---|
| DE | 1490508 | 12/1971 |
| DE | 2263222 | 6/1974 |
| DE | 102006054843 | 4/2008 |
| DE | 102011001985 | 10/2012 |
| EP | 1050912 | 11/2000 |
| WO | 2012167921 | 12/2012 |

OTHER PUBLICATIONS

English translation of the International Preliminary Report on Patentability dated Jan. 31, 2019 from corresponding International Application No. PCT/EP2017/054329, 10 pages.

* cited by examiner

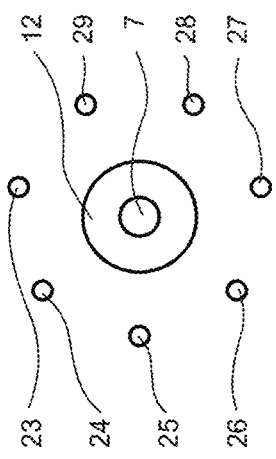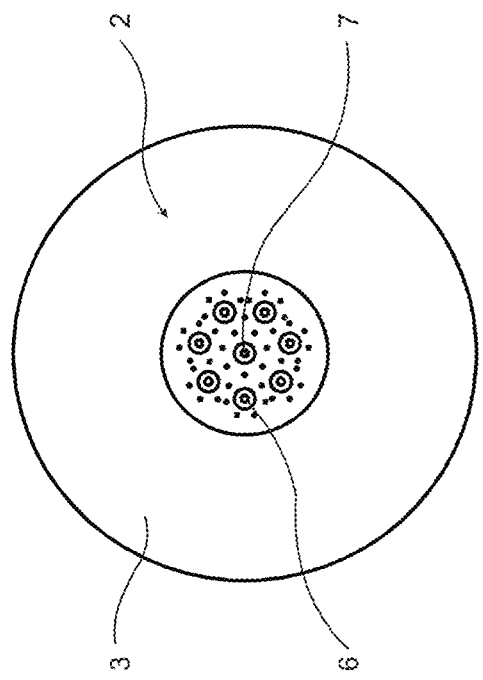

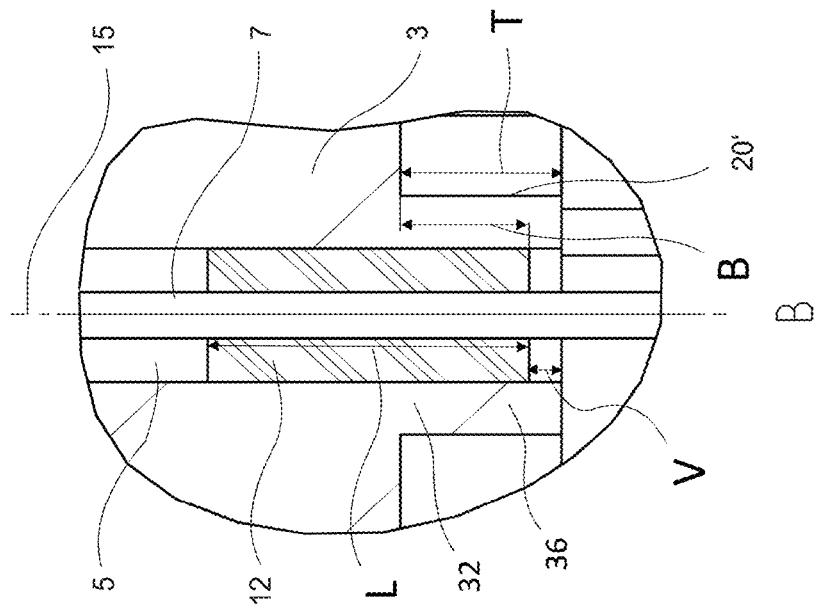
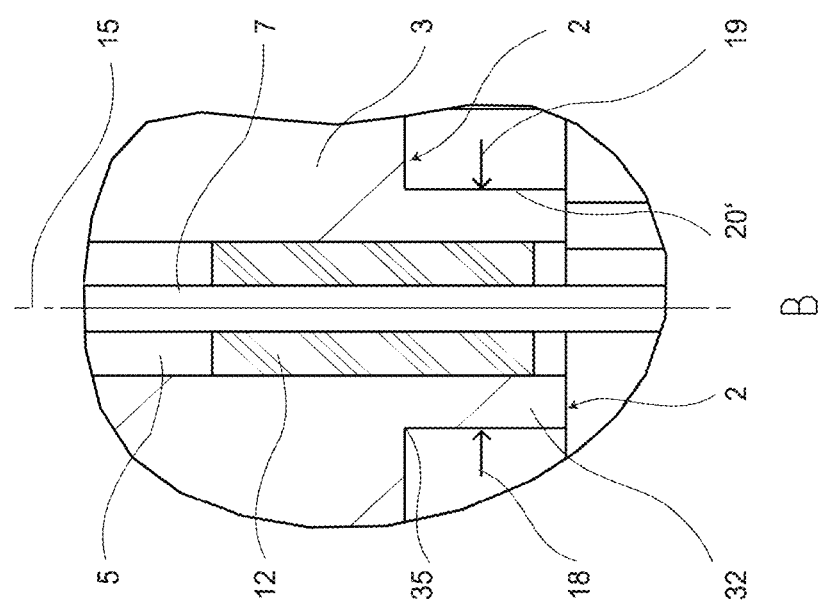

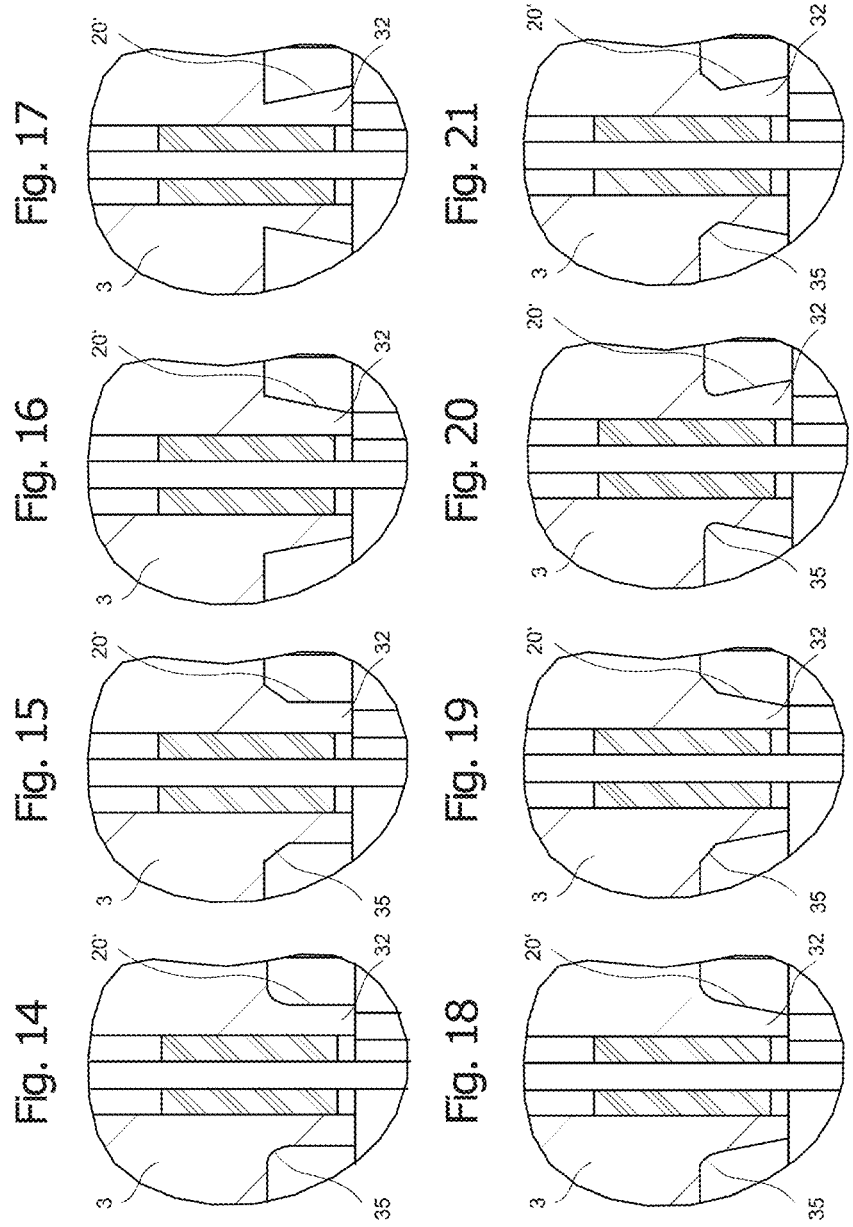

FEED-THROUGHS FOR HIGH EXTERNAL PRESSURE APPLICATIONS AND METHOD FOR PRODUCING SAME

CROSS REFERENCE TO RELATED APPLICATIONS

This application is a continuation of International Application PCT/EP2017/054329 filed Feb. 24, 2017, which claims benefit under 35 USC § 119 of German Application 102016103485.1 filed Feb. 26, 2016, the entire contents of both of which are incorporated herein by reference.

BACKGROUND

1. Field of the Invention

The invention relates to feed-throughs for high external pressure applications and to methods for producing such feed-throughs.

2. Description of Related Art

For a variety of applications, feed-throughs are used which have to reliably withstand high external pressure. In particular if these feed-throughs come into contact with fluids under high pressure on one side thereof, their reliable and safe use and resistance under long-term operation is of great importance, including in terms of safety. Such applications include deepwater facilities such as production and exploration facilities, i.e. in the exploration and/or production of in particular oil and/or natural gas deposits, or use thereof in environments that are contaminated chemically or by radiation, such as in the chemical industry or in energy plant and reactor technology. Other applications include, for example, manned and unmanned watercraft, such as diving robots and submarines, and special gas tanks, such as CO2 storage tanks, or liquid natural gas (LNG) tanks, or H2 tanks, in particular for motor vehicles with fuel cells which require a pressure resistance of 700 bar, for example.

U.S. Pat. No. 4,797,117 discloses connectors having a rubber sheath within which sealing lip rings of a wedge-like cross-sectional shape are urged into sealing engagement on an insulated conductor using an element that has conical openings. This configuration of the connector is in particular intended to allow for on-site installation and repair thereof.

U.S. 2006/0179950 A1 discloses a feed-through in a housing for a component that comprises a pressure sensor, with a fluid sealing ring of substantially wedge-like cross-sectional shape which surrounds the component in sealing manner within a frusto-conical opening of the housing. In order to provide an easier manufacturing process, it is proposed to assemble the wedge-shaped fluid sealing ring by pressing it with forces that are so high that the yield point of at least one of the housing and the component is exceeded.

DE 10 2006 054 843 A1 discloses an electrical feed-through in particular for pressure applications, with a housing passage at least in the region of a first end of the housing, in which the housing side experiencing the pressure forms at least two openings on a section of the housing outer surface. The at least two openings preferably have the same surface area or substantially the same surface area. The at least two openings are furthermore offset around the housing axis, at equal angular intervals, and preferably such that the axes of the openings and therefore also the lines of force of the forces resulting from the pressure on the pressure side intersect in a common point, preferably together with the housing axis. This configuration is intended for pressure applications to provide a compensation of the pressures acting on the openings. A drawback of this feed-through is that the forces resulting from the application of pressure are directed through the insulating material surrounding the respective conductor, and that compensation can be achieved only in pairs, with two conductors in each case. Furthermore, in this arrangement, the respective conductors are routed with a bent about 90° in a housing opening, which not only makes manufacturing difficult, but also complicates the routing geometry of the conductors. In addition, the geometric dimensions are many times more space consuming than would be necessary if the conductors would be routed straightly.

WO 2012/167921 A1 describes a feed-through for a battery housing in which a base body is welded into a housing. In order to keep thermal and/or pressure loads away from the glass seal of the conductor, a groove is provided in the base body at the boundary to the housing, which is intended to act like a cooling fin of a heat sink during welding. In case of a thermal runaway of batteries, the feed-through is in particular exposed to thermal loads. The occurring pressures play a minor role for the feed-through, since the housings will usually break before. Therefore, compression glass sealing should moreover be guaranteed over the entire operating range in the feed-throughs shown, which is why most of the material of the base body is located between the groove and the glass seal. When external pressure is experienced, the latter is intended to be kept away in particular from the glass seal.

DE 14 90 508 A describes a vacuum-tight electrical feed-through for high current loads, which has an annular recess which is arranged in a likewise annular flange. This annular recess is of elastic nature in order to accommodate a thermally induced expansion of a conductor comprising a copper pin. Due to the necessarily given deformability of the annular recess, the latter is not suitable for use under high external pressures. The same applies to the copper pin which is retained, with some lateral play, in a tube made of chromium steel. Here, again, most of the material of the base body is located between the groove and the glass seal.

DE 2 263 222 A discloses an electrical compression glass seal feed-through mountable by welding, for vacuum-tightly or pressure-tightly sealed containers, comprising a multiplicity of compression glass seal feed-throughs that are surrounded by a radial groove arranged adjacent to a welding lip. Since compression glass seal connections are arranged radially one behind the other with respect to an axial center line of this feed-through, this groove cannot be effective as a pressure compensator and thus does not improve pressure resistance of this feed-through to high external pressures. The same applies to the gas-tight feed-through shown in DE 1 490 333 A, which is intended for two 3-phase conductor systems, each with a neutral conductor, in particular since, again, most of the material of the base body is located between the groove and the glass seal.

U.S. Pat. No. 4,213,004 B discloses a gas-tight joint arranged in a Kovar feed-through, in which a cylinder made of Kovar is held, with some lateral play, within an aluminum welding lip by an electron beam weld. The welding lip is adapted to provide weldability of an aluminum flange to a Kovar sleeve by a nickel bond line. This feed-through is not capable of withstanding high pressures.

The vacuum-tight feed-through of DE 16 65 564 A, in which an electrically conductive pin is surrounded by a hollow cylindrical insulating body, has a collar on the side of the external pressure, which surrounds the electrically conductive pin but opens like a funnel to the outside so that fluids under elevated pressure tend to penetrate between this collar and the electrically conductive pin.

Furthermore, it is known from prior art to glass seal conductors in base bodies, which are prefabricated and then connected to a housing by thermal processes, such as by welding. In this case, a thermal overload of the glass seal is avoided by relief features in the base body, these relief features locally increasing the surface of the base body thereby acting as a heat sink in front of the glass seal. Such relief features may also serve to keep away, from the glass seal, stresses that arise during the assembly by welding of the base body due to the thermal expansion of the housing and/or the base body, so that the glass seal is not damaged. In this case, the prior art base bodies are designed so that the pressure radially acting on the glass seal is kept as constant as possible regardless of the ambient temperature, or is at least reduced to an extent so that a low upper threshold is not exceeded. For this purpose, the relief features are usually provided near the interface of the base body to the housing, at a safe distance from the glass seal. Such feed-throughs are usually not appropriate to withstand high external pressures, in particular pressures of more than 1000 bar, since the outer flange is often weakened in such cases without however compensating for an elevated external pressure.

SUMMARY

In the structural design of the feed-through according to the invention, the width of the pressure compensator, in particular the annular groove, is advantageously designed so as to be as narrow as possible. The width of the pressure compensator which can be achieved depends mainly on the manufacturing process. When eroding, groove widths of about 1 mm and less can be achieved. When milling, a few millimeters can usually be achieved. The width (radial extent Wg) of the pressure compensator may thus be very small and may yet have all the positive effects, since radially effective forces increasing pressure resistance will still arise in the same way. Thus, however, the impact of pressure forces on the base body can be reduced by a smaller width Wg of the groove, because such forces increase proportionally with the size of the bottom surface of the respective annular groove. Consequently, a wider groove with the same inner diameter will reduce the pressure resistance of the feed-through proportionally to the square of the outer diameter of the groove and thus with increasing width Wg of the groove when the outer diameter increases, which is compensated for with an increase in the thickness of the base body, if the grooves are becoming wider.

In this case, the material remaining under the annular groove, the blind hole-type openings or the protruding portion is dimensioned such that it reliably withstands the external pressures occurring under operating conditions.

For preferred embodiments, the volume of the material between the groove and the insulating material is much smaller than the volume of the material of the base body between the groove and the outer edge of the feed-through, in particular if the feed-through is intended to be welded into further assemblies when being mounted later.

The invention intends to provide feed-throughs which are capable of reliably holding also individual functional elements, such as functional elements comprising conductors, and this in a simple and fluid-tight manner during long-term operation and even under high pressures. In the context of the present disclosure, high pressures in particular refer to pressures of more than 1000 bar, advantageously in particular even pressures of more than 1500 bar or more than 2000 bar. Furthermore, it would be advantageous to avoid complex routing geometries, for example for functional elements that comprise conductors. It would also be advantageous to avoid space-consuming geometries and to allow to arrange a plurality of functional elements next to each other in the feed-through.

For this purpose, the invention provides a feed-through, in particular for high external pressure applications, which comprises a base body and at least one through-hole extending through the base body, and at least one functional element, wherein the at least one functional element is arranged inside the at least one through-hole, wherein the at least one functional element is connected to the base body in fluid-tight manner, preferably with an insulating material at least partially surrounding the functional element and preferably establishing the fluid-tight connection, and with pressure compensator for the fluid-tight connection of the at least one functional element with the base body, in particular external pressure compensator, which preferably enhance the pressure resistance of the fluid-tight connection of the at least one functional element to the base body against pressure, in particular external pressure, and wherein, preferably, pressure components resulting from the pressure, in particular the external pressure, are directed perpendicularly to the longitudinal direction of the through-hole to peripheral regions of the material of the base body surrounding the at least one through-hole, and wherein these peripheral regions preferably extend obliquely or in parallel to the longitudinal axis of the at least one through-hole.

Particularly advantageously, the fluid-tight connection is moreover hermetically sealed, that means the helium leak rate is less than $1*10-3$ mbar*l/sec at a pressure difference of 1 bar within the range of operating pressures.

Preferably, the invention also provides a feed-through, in particular for high external pressure applications, which comprises a base body and at least one through-hole extending through the base body, and at least one functional element, wherein the at least one functional element is arranged inside the at least one through-hole, wherein the at least one functional element is connected to the base body in fluid-tight manner, preferably with an insulating material at least partially surrounding the functional element and preferably establishing the fluid-tight connection, and with an annular groove in the material of the base body, which is preferably arranged symmetrically relative to the through-hole, and/or with openings, preferably blind hole-type openings in the material of the base body, which are preferably arranged symmetrically relative to the through-hole, in particular with their longitudinal axes arranged on a full circle surrounding the through-hole, and/or with a protruding portion of the base body, which is preferably arranged symmetrically relative to the through-hole.

In the preferred embodiments, a peripheral wall of the pressure compensator abutting against the insulating material under the pressure experienced during operating conditions is pressed perpendicularly to the direction of the axis of the through-hole, thereby producing a clamping force on the insulating material, which depends on the operating condition, in particular the external pressure.

In a preferred embodiment, the pressure compensator are provided as a peripheral wall abutting against the insulating material, and by the pressure experienced under operating conditions at least portions of the peripheral wall are pressed perpendicularly to the direction of the axis of the through-hole, thereby producing a clamping force on the insulating material, which depends on the operating condition, in particular the external pressure.

In order to emphasize the functional diversity of possible uses of the functional element, the latter is not only referred to as a function element, but alternately also as a functional element in the context of the present disclosure.

Surprisingly, with these measures, the connection between the base body and the functional element, in particular the connection between the insulating material and the base body was able to withstand in fluid-tight manner operating pressures that were increased by 20%, preferably by 50%, and most preferably by 100% compared to a feed-through without pressure compensator, in particular external pressure compensator. Likewise, the pressure resistance of the feed-through was increased preferably by 20%, more preferably by 50%, and most preferably by 100%, or by even more than 100%.

A feed-through according to the invention is in particular able to withstand external pressures of more than 1000 bar. The inventors have found that, in simplified terms, one of the working principles of the invention is based on the fact that under operating conditions or in case of an incident, the external pressure acting on the feed-through itself is used to stabilize the glass seal in the through-hole. The pressure compensator are adapted so that the pressure acting thereon it acting radially on the insulating material, that is perpendicularly to a longitudinal axis or axis of symmetry of a through-hole of the feed-through, so that with increasing pressure an increasing clamping effect is exerted on the insulating material, which is advantageously able to prevent the through-hole from bending up. For this purpose, the material of the base body must be deformable by the pressure, in particular elastically deformable, advantageously reversibly elastically deformable, at least in the vicinity of the pressure compensator. Parameters for the design of the pressure compensator may include, besides the choice of the material itself, the material thickness remaining between the pressure compensator and the insulating material, but also the depth of the pressure compensator measured in parallel to the axis of the through-hole. Expressed in very simplified terms, the inventors exploit the surprising finding that a weakening of the material of the base body by the pressure compensator leads to an increase in the pressure resistance of the feed-through.

Equally possible is the use thereof in machines such as, e.g., water jet cutting machines, presses, hydraulic systems, common rail injection systems, and similar applications in which high pressures of fluids are encountered, in particular encountered on one side of a feed-through. The invention moreover in particular permits to connect sensors and/or actuators as well as any other in particular electrical loads and/or generators to other equipment in high pressure environments.

Most surprisingly, the inventors have furthermore found that according to a further preferred embodiment, the width of the groove may increase, in particular even increase to an extent that there will be no groove anymore in the radial direction but instead an open space which then extends in front of a protruding portion in a lateral direction, i.e. radially outward direction. Instead of the inner surface of the annular groove, a protruding portion with an outer surface will thus be formed in this modified embodiment, and the outer surface of the protruding portion will then function substantially in the same way as the inner surface of the groove. Because of this similar effect, the respective statements made below with respect to the inner surface of the annular groove also apply to the outer surface of the protruding portion, in particular in the case of a similar embodiment except for the width of the groove.

In the constructive design of such a feed-through with protrusion, the material thickness of the base body in the portion beyond the protrusion is chosen such that the base body withstands the anticipated pressures. Then, a protrusion with a comparatively small wall thickness is provided.

In preferred embodiments, the volume of the material of the protruding portion is much smaller than the volume of the material of the base body between the protruding portion and the outer edge of the feed-through, in particular if the feed-through is intended to be welded into further assemblies when being mounted later.

The feed-throughs according to the invention are in particular suitable for enabling, when using the feed-through, to connect to each other components and/or devices, and/or to operate sensors and/or actuators. Since such feed-throughs can be advantageously used in many ways, in particular for deepwater facilities in the deep sea, such as in drilling or exploration equipment for oil and/or natural gas, and/or in environments that are contaminated chemically or by radiation, such as in the chemical industry or in energy plant and reactor technology, in particular in potentially explosive areas, in a power generation or energy storage appliance having a housing, or in an encapsulation of a power generation or energy storage appliance or of a reactor or of a storage device for toxic and/or harmful matter, in particular as a feed-through means in a containment of a reactor or a feed-through means through the containment of a reactor, in particular of a chemical or nuclear reactor, or in a spacecraft or space exploration vehicle, or in diving robots and/or manned or unmanned submarines, or in a housing of a sensor and/or actuator, the pressure acting on the feed-through may be an internal pressure, for example in the case of reactors, and in other applications it may be an outer pressure, i.e. external pressure, for example in the deep sea. Consequently, that side of the base body which experiences the increased external or internal pressure, that is, more generally, the increased pressure, will be referred to as the pressure-facing side of the base body.

Advantageously, the pressure compensator comprises an annular groove in the material of the base body, which is preferably arranged symmetrically relative to the at least one through-hole, on the side of the base body facing the pressure, in particular the external pressure.

Likewise advantageously, the pressure compensator may, alternatively or additionally, comprise openings, preferably blind hole-type openings, in the material of the base body, which are preferably arranged symmetrically relative to the at least one through-hole, in particular with their longitudinal axes on a full circle surrounding the through-hole, on the side of the base body facing the pressure, in particular the external pressure.

In a further advantageous embodiment, the pressure compensator may, alternatively or additionally, comprise a protruding portion of the base body, which is preferably formed as an annular elevation symmetrical relative to the through-hole, on the side of the base body facing the pressure, in particular the external pressure.

In a first preferred embodiment, the depth of the annular groove or of the blind hole-type opening extends to that depth which is approximately in the middle of the depth of the insulating material surrounding the functional element and establishing the fluid-tight connection; or the end of the protruding portion proximal to the base body terminates approximately at half the height of the insulating material which preferably establishes the fluid-tight connection.

In a second preferred embodiment, the depth of the annular groove or of the blind hole-type opening extends to that depth at which the insulating material surrounding the functional element and establishing the fluid-tight connection begins to abut against the base body; or the end of the protruding portion proximal to the base body terminates at that level on the base body where the insulating material surrounding the functional element and establishing the fluid-tight connection begins to abut against the base body.

In a third preferred embodiment, the depth of the annular groove or of the blind hole-type opening extends to that depth at which the insulating material surrounding the functional element and providing the fluid-tight connection stops to abut against the base body; or the end of the protruding portion proximal to the base body terminates at that level on the base body where the insulating material surrounding the functional element and establishing the fluid-tight connection stops to abut against the base body.

In a fourth preferred embodiment, the depth of the annular groove or of the blind hole-type opening extends beyond that depth at which the insulating material surrounding the functional element and providing the fluid-tight connection stops to abut against the base body; or the end of the protruding portion proximal to the base body terminates lower on the base body than at the point where the insulating material surrounding the functional element and establishing the fluid-tight connection stops to abut against the base body.

The depth of the annular groove or of the blind hole-type openings can be used to adjust the pressure behavior of the feed-through. In particular in the embodiment in which the depth of the annular groove or of the blind hole-type opening extends to a depth which is within the range of the insulating material, i.e. the depth thereof is in a plane perpendicular to the axis of the through-hole and overlaps with the extent of the insulating material along the through-hole, the pressure resistance of the feed-through is adjustable through the depth of the through-hole, at different external pressures. In principle, the deeper the annular groove or the blind hole-type opening, the higher pressures the feed-through is able to withstand. However, high pressure resistance is at the expense of the pressure strength or squeeze-out resistance of the insulating material towards lower pressures. The same effect also occurs in the embodiments with protruding portion in which the extent of the protruding portion in the direction of the longitudinal axis of the through-holes then functionally corresponds to the depth of the groove or of the blind hole-type openings.

If the surface of the insulating material on the side facing away from the pressure lies below the plane of the depth of the annular groove or of the blind hole-type openings which extend into the base body from the pressure-facing side, this range of the glass seal length contributes to the squeeze-out resistance and/or hermeticity of the feed-through in particular at pressures of less than 1000 bar. The portion along the length of the glass seal, which extends in parallel to the annular groove or to the blind hole-type openings is adapted, as described above, to exert a clamping effect on the insulating material when pressures are applied. This portion then contributes to the tightness of the feed-through at 1000 bar and above. Therefore, preferably, the depth of the annular groove or of the blind hole-type openings and the length of the glass seal and/or of the overlap range are balanced. A preferred trade-off is reached in the range where the depth of the annular groove or of the blind hole-type openings or a length of the protruding portion in the direction of the longitudinal axis of the through-hole corresponds to approximately half the length of the glass seal, with deviations upwards or downwards of preferably 30%, more preferably 20%, most preferably 10%. Here, the term 'glass seal length' refers to the length over which the insulating material extends within the respective through-hole in the longitudinal direction of the through-hole while abutting against the base body and preferably also against the functional element.

Particularly preferably, the functional element is an electrical conductor or the functional element comprises an electrical conductor.

In a further advantageous embodiment, the pressure compensator comprise a circular annular groove and/or openings, preferably blind hole-type openings in the material of the base body, which are preferably arranged symmetrically relative to the through-hole, and/or comprise a protruding portion of the base body, which is preferably arranged symmetrically relative to the through-hole.

If the insulating material which preferably establishes the fluid-tight connection comprises glass and/or glass-ceramic material and/or ceramic material and the feed-through preferably comprises a compression glass seal in which the glass and/or the glass-ceramic material and/or the ceramic material is connected to each of the base body and the functional element in fluid-tight manner, at least in portions thereof, it is possible in this way to achieve hermetically sealed connections that are durable under long-term operation.

A compression glass seal is obtained if the thermal expansion coefficient of the material of the base body is greater than that of the material of the insulating material fused into the through-hole. In conventional compression glass fabrication, the thermal expansion coefficient of the functional element is equal to or smaller than the thermal expansion coefficient of the insulating material. Although a slightly higher thermal expansion is also possible, however, it might reduce the pressure in the glass seal which is exerted by the insulating material to the functional element in the radial direction, and thus the pressure resistance and squeeze-out resistance. With the groove or the protruding portion, it is now also possible to use a higher expansion material for the functional element, since the additional pressure is passed through the insulating material to the functional element, and, thus, the feed-through of the invention is nevertheless suitable for higher pressures, despite the mismatch that would exist for conventional embodiments.

Preferably, the material of the functional element comprises a metal, in particular selected from the group comprising steel, stainless steel, titanium, titanium alloys, aluminum, and aluminum alloys, but in particular a NiFe alloy, preferably CF25, an FeCo alloy, particularly preferable also a beryllium-copper alloy, Kovar, CF25, tungsten, Inconel, such as Inconel 690, Inconel 625, Inconel 740, Inconel 740X, Inconel 750, Inconel 750X.

Particularly preferably, the pressure experienced by the material of the base body within the operating pressure range of the feed-through does not exceed the limit of elastic deformation, or yield point, of the material of the base body and of the material of the functional element.

The annular groove and/or the protruding portion may as well have a non-rectangular, in particular a frusto-conical cross-sectional shape, and/or the blind hole-type openings may be arranged so as to extend obliquely. With this implementation it is possible to advantageously adjust the impact of the pressure component acting perpendicularly to the longitudinal axis of the at least one through-hole adapted to respective different depths.

Furthermore, a particularly advantageous feed-through, in particular for high external pressure applications, is where DO designates the outer diameter of the inner surface of the annular groove or the outer diameter of the outer surface of the protruding portion, and Di designates the diameter of the insulating material and thus in particular the diameter of the through-hole, and the ratio DO/Di has a preferable value ranging from a DO/Di of less than or equal to 2 to greater than or equal to 1.05, a particularly preferred value of the ratio DO/Di ranging from less than or equal to 1.6 to greater or equal to 1.10, and the most preferred value of the ratio DO/Di ranging from less than or equal to 1.35 to greater than or equal to 1.15.

Likewise advantageous is a feed-through, in particular for high external pressure applications, in which a range of overlap between the pressure compensator and the glass seal and hence the glass seal length of the insulating material in the longitudinal direction of the through-hole has a value of 0%, 50%, or 100% of the length of the glass seal, while other preferred amounts of this range of overlap are 10%, 15%, 20%, and particularly preferably also 30% of the length of the glass seal.

In a method for producing a feed-through, in particular for high external pressure applications, a pressure compensator is formed on a base body of the feed-through, which increases the pressure resistance of the feed-through, and for forming the pressure compensator, material of the base body is reduced in the vicinity of the through-hole on the side of the base body facing the pressure.

Advantageously, in this method, the material of the base body may be reduced so as to form an annular groove, a blind hole-type bore, or to form a protruding portion, in particular in a material-removing manner. Advantageous processes include eroding and/or milling. However, likewise conceivable for fabricating the base body are processes which provide the required configurations by molding. For example, the base body can be produced by casting processes, in particular die casting, or else by cold forming processes.

The feed-through of the invention has further advantages in its application in addition to the surprisingly high pressure resistance. Comparative tests with feed-throughs without pressure compensator and with conical or step-like profiles of the through-hole, which represent retaining means for the insulating material, have shown that the feed-throughs according to the invention with pressure compensator exhibit a lower tendency for spontaneous breaks of the insulating material. In the event of such spontaneous breaks, the insulating material is destroyed when a pressure limit is reached, and will burst out of the through-hole. In tests, this burst pressure is measured on a multitude of components, and the result is a Gaussian distribution with a distribution width around a mean value of the burst pressure. Compared with feed-throughs having retaining means, the feed-throughs with pressure compensator according to the invention exhibit a significantly smaller distribution width around the mean value. This means that a smaller safety margin to the required pressure tightness has to be considered in the configurational design of a feed-through according to the invention. Moreover, fewer spontaneous failures are to be expected during operation of a feed-through according to the invention, which improves long-term operation stability and reliability thereof, even in rough application environments.

It is assumed that the clearly improved behavior in terms of spontaneous bursting and/or burst pressure of the feed-through with pressure compensator according to the invention can be explained by its working mechanism. In the case of brittle insulating materials, in particular glass materials and/or at least partially crystalline materials in the through-hole, breakage thereof is usually initiated by formation of an initial crack which propagates further in the insulating material. The initial crack can be induced by anisotropies and/or defects in the volume of the insulating material, but in particular by defects and/or damage at the surface thereof. In particular surface damage may arise during operation by interaction with the fluid and/or foreign matter, and may be unavoidable under certain circumstances. Initial cracks with substantial sections in parallel to the axis of the through-hole can above all be decisive for the described spontaneous breaks. However, the pressure compensator of the feed-through according to the invention, when subjected to pressure, causes a pressure component being produced perpendicular to the axis of the through-hole and thus perpendicular to the propagation direction of critical initial cracks in the insulating material. It is assumed that resulting initial cracks are thereby pressed together, and propagation thereof is thus prevented or at least hindered.

A feed-through as disclosed herein in its various embodiments and in particular disclosed as being configured according to the invention can be use in particularly advantageous manner for deepwater facilities and/or for oil and/or natural gas production or exploration equipment, and/or in environments that are contaminated chemically or by radiation, such as in the chemical industry or in energy plant and reactor technology, in particular in potentially explosive areas, in a power generation or energy storage appliance having a housing, or in an encapsulation of a power generation or energy storage appliance or of a reactor or of a storage device for toxic and/or harmful matter, in particular as a feed-through means within a containment of a reactor or a feed-through means through the containment of a reactor, in particular of a chemical or nuclear reactor, or in a spacecraft or space exploration vehicle, or in manned and unmanned watercraft, such as diving robots and submarines. The invention is particularly suitable for connecting transmitter and/or receiver devices, and/or in a housing of a sensor and/or actuator in all these applications, or in gas tanks, in particular $CO_2$ storage tanks or $H_2$ tanks or LNG tanks, or preferably also for motor vehicles with fuel cells or high-pressure injection systems such as common rail systems, or particularly preferably in machines such as presses or hydraulic equipment and/or devices.

BRIEF DESCRIPTION OF THE DRAWINGS

The invention will be described in more detail below by way of preferred embodiments and with reference to the accompanying drawings, wherein:

FIG. 1 is a cross-sectional view of a first preferred embodiment of a feed-through wherein the pressure compensator comprise an annular groove, with the sectional plane extending approximately perpendicularly through the center of the feed-through;

FIG. 2a is a further cross-sectional view of the detail A of the first preferred embodiment illustrated in FIG. 1, in particular for furthermore illustrating the glass seal length L and the range of overlap B with the respective pressure compensator comprising a groove in this embodiment;

FIG. 3 is a cross-sectional view of a feed-through without pressure compensator, with the sectional plane extending approximately perpendicularly through the center of the feed-through;

FIG. 8a is a plan view of a feed-through of a further preferred embodiment in a direction corresponding to the direction of the arrow X in FIG. 1, in which the pressure compensator comprise blind hole-type openings in the material of the base body;

FIG. 8b is a plan view of the functional element of the feed-through shown in FIG. 8a, in a direction corresponding to the direction of the arrow X in FIG. 1, in which the blind hole-type openings in the material of the base body surrounding the functional element can also be seen;

FIG. 9 is a cross-sectional view of a first preferred embodiment of a feed-through in which the pressure compensator comprise a protruding portion of the base body in the form of an annular elevation, with the sectional plane extending approximately perpendicularly through the center of the feed-through;

FIG. 10 is a cross-sectional view of the detail B of the first preferred embodiment of a feed-through as shown in FIG. 9;

FIG. 10a is a further cross-sectional view of the detail B of the first preferred embodiment of a feed-through, in particular for furthermore illustrating the glass seal length L and the range of overlap B with the respective pressure compensator which comprises a protruding portion in this embodiment;

FIGS. 14 to 21 show different cross-sectional shapes of the protruding portion.

DETAILED DESCRIPTION

Figure 1:
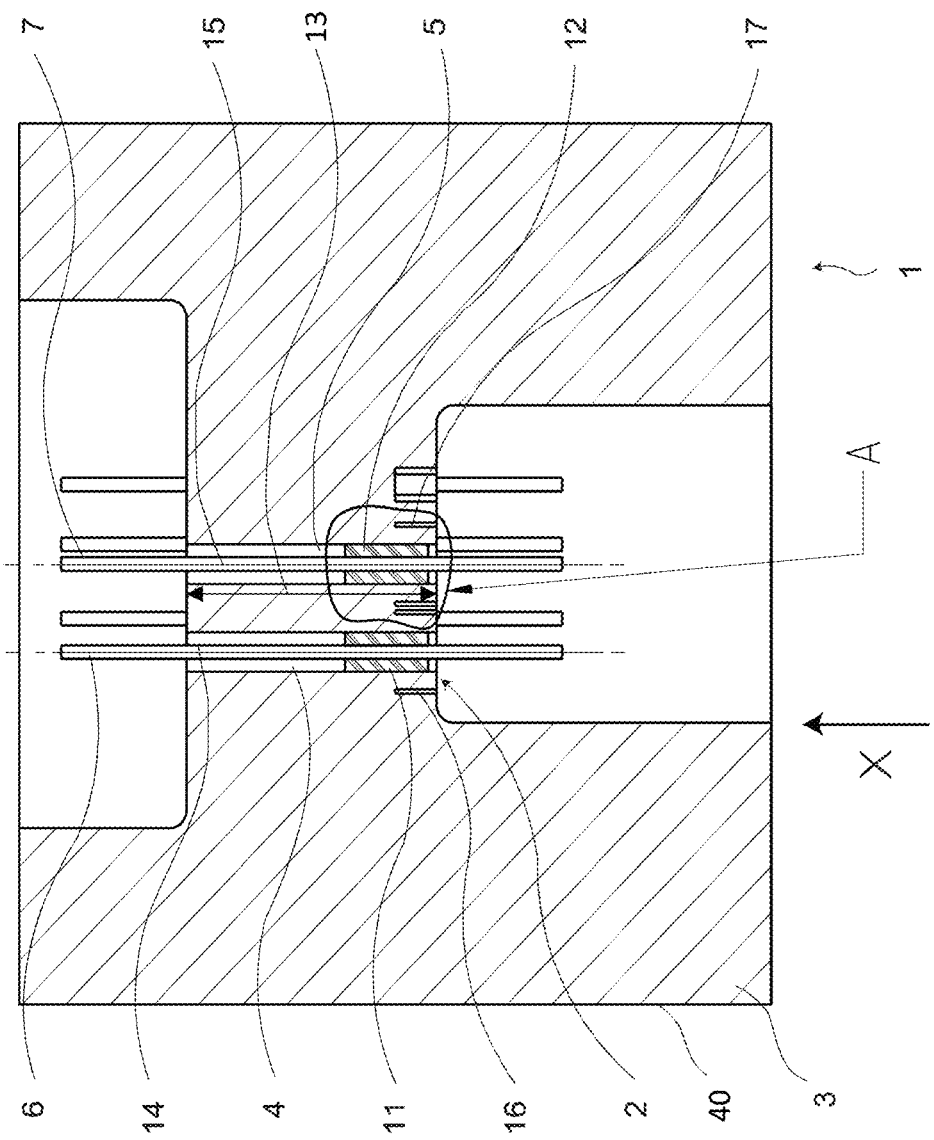

In the following detailed description of the preferred embodiments, the same reference numerals designate the same functional elements, respectively, and the views are not always drawn to scale, for the sake of clarity.

First referring to FIG. 3, a feed-through without pressure compensator will be described, in order to be able by way of this description to better understand the effects and advantages according to the invention further below.

Figure 3:
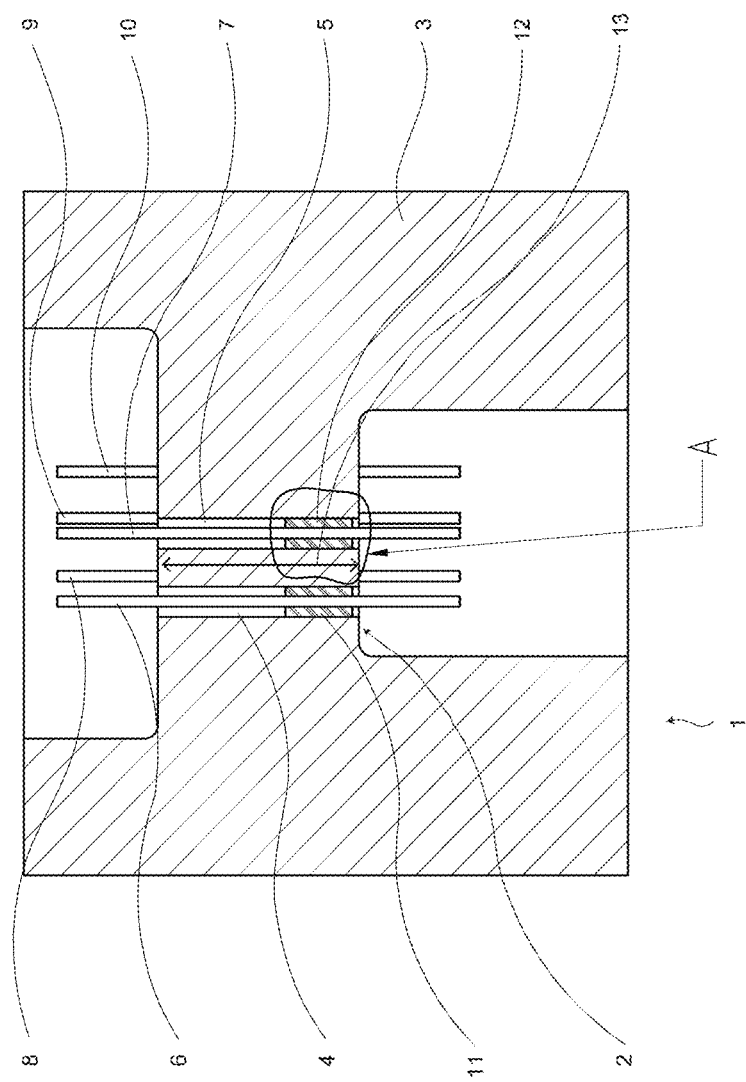

Reference numeral 1 in FIG. 3 designates the feed-through 1 to be described as a whole, which experiences the pressures that are to be mastered by the feed-through 1 at the pressure-facing side 2 of the base body 3, in particular the side facing external pressure.

Through-holes 4 and 5 extend through the base body 3, with functional elements 6 and 7, respectively, arranged therein, which are retained therein by a compression glass seal, as will be described in more detail below.

Although further functional elements 8, 9, and 10 can be seen in a side elevational view, the respectively associated through-holes are not visible due to the position of the sectional plane. Because of the functional equivalence given in the present case, the statements below relating to functional elements 6 and 7 similarly apply to functional elements 8, 9, and 10.

The insulating material 11 and 12 which surrounds at least portions of the respective functional element 6 and 7 is used to create a fluid-tight connection between the functional element 6 and 7, respectively, and the base body 3.

If the insulating material comprises glass or glass-ceramic material, this fluid-tight connection may be implemented as a compression glass seal of the functional element 6 and 7 in the base body 3.

In the context of the present disclosure, for example, feed-throughs are referred to as being fluid-tight if they exhibit a leak rate of less than 1*10-3 mbar*l/sec for He and at a pressure difference of 1 bar, in the entire range of operating pressures.

Previously, feed-throughs were usually designed so that the insulating material which holds the functional element that is used to establish an electrical connection, for example, was slightly recessed behind the surface of the base body in the through-hole.

It has been found that fluid under high pressure entering this area may "bend up" the through-hole, whereby the insulating material might be squeezed out of the base body and the feed-through might fail as a result, i.e. lose its fluid tightness or hermeticity. This effect is quite capable of determining the maximum pressure load limit of the feed-through.

Within the context of the present disclosure, the term 'pressure resistance' is additionally used for the maximum pressure load limit, indicating the highest pressure which the particular feed-through will just withstand.

In one such feed-through, failure was determined at about 2700 bar, in case of a glass other than the specified glass sometimes even already at 2000 bar, which means that at 2700 bar no hermetic or fluid-tight connection was provided anymore, since the pressurized fluid was able to penetrate between the base body 3 and the insulating material 12, while, however, the connection between the functional element 6, 7 and the insulating material 11, 12 was substantially not damaged.

The base body 3 of this feed-through 1 was made of Inconel 625, and the glass used for the compression glass seal was borosilicate glass G018-385 which has a softening or glass transition point Tg of 992° C. The thickness of the base body 3 shown by a double arrow 13 in FIG. 3 was 3 cm. The diameter of the through-hole 4, 5 and thus also the outer diameter of the glass used as the insulating material 11, 12 was 4.5 mm.

When, now, material was removed from this base body 3 in suitable manner and as will be described in more detail below, it was possible to significantly increase the pressure resistance of this feed-through.

Reference is now made to FIG. 1 in order to explain an essential aspect of the present invention, by way of example only and with respect to the through-holes 4, 5 of the base body 3 and the respective insulating material 11, 12 held therein and the respective functional element 6, 7, which, however, was realized in a similar manner in the other preferred embodiments that will be described in more detail further below.

This first preferred embodiment of a feed-through 1 as illustrated in FIG. 1 corresponded entirely to the feed-through 1 described with reference to FIG. 3, except for the pressure compensator explained below. Hence, again as well as in the other embodiments, the double arrow 13 indicates the thickness D of the base body 3 in the axial direction at a location at which there are no portions of the pressure compensator, i.e. no annular groove, no blind hole-type opening and no protruding portion in the axial direction, as can be seen by the double arrows 13 in FIGS. 1 and 9, for example. By constructive design, this thickness D, 13, of the base body 3 is selected such that even a reduction in the range of the annular grooves 16, 17 or the blind hole-type openings 23 to 29 by a depth T thereof does not lead to a reduction in pressure resistance of the feed-through 1. The same applies to the respective portion of the base body 3 below and next to the protruding portions 30 to 34.

The longitudinal direction of the through-hole 4, 5, which is also referred to as axis or center line in the context of the present disclosure, is shown by a respective dash-dotted line 14, 15 in FIG. 1, and in the case of a through-hole with a circular cross-sectional shape, that is a cylindrical through-hole, it corresponds to the line of symmetry thereof, which is also referred to as the cylinder axis thereof. Wherever reference is made to the longitudinal direction in the context of the present disclosure, this will be the direction of the lines 14, 15. However, if reference is made to the longitudinal axis, this should also include the actual local position of the dash-dotted lines 14, 15, thus the actual local position of the axis of symmetry, in particular the cylinder axis, and should thus also allow to refer to this spatial position, in particular for dimensioning information.

As pressure compensator, annular grooves 16, 17 were introduced into the base body 3, for example by spark eroding, which were in particular arranged symmetrically relative to the respective through-hole 4, 5, with their respective cylinder axes coinciding, on the pressure-facing side 2 of the base body 3, in particular the side facing external pressure.

Pressure components caused by the external pressure in the annular grooves 16, 17 were directed perpendicularly to the longitudinal direction 15 of through-hole 5, that is in the radial direction or radially to the longitudinal axis, towards edge regions of the material of the base body 3 surrounding the at least one through-hole. The pressure arising in groove 17, by way of example, initially acts in all directions, and thus in particular also in the direction of arrows 18 and 19, which extend perpendicularly to the longitudinal direction 15 of the through-hole 5. However, these force components counteract the up bending forces of the prevailing pressure in pressure-compensating manner and are indicated in similar manner in the further embodiments in order to illustrate the pressure-compensating effect there as well.

Preferably, a metal is used for the material of base body 3, in particular comprising or made of steel, stainless steel, FeCo alloys, titanium, titanium alloys, aluminum and aluminum alloys, Kovar or Inconel, for example Inconel 690 and/or Inconel 625 and/or Inconel 740 and/or Inconel 740X and/or Inconel 750 and/or Inconel 750X, and thus preferably providing a predefined elasticity.

The peripheral regions on which the force components of the pressure act in a pressure-compensating manner preferably extend obliquely or in parallel to the longitudinal axis of the at least one through-hole, such as the inner surface 20 of the annular groove 17.

Figure 5:
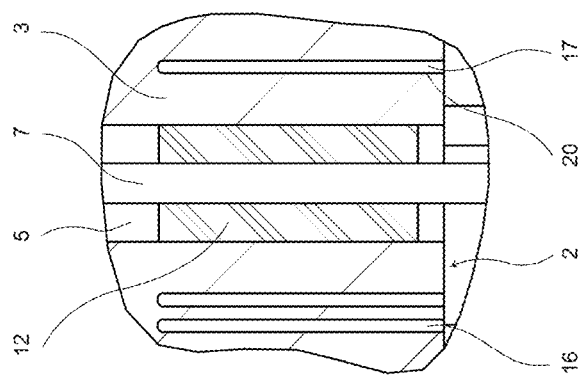
FIG. 5 is a cross-sectional view of the detail A of a third preferred embodiment, in which the pressure compensator comprise an annular groove.
Figure 6:
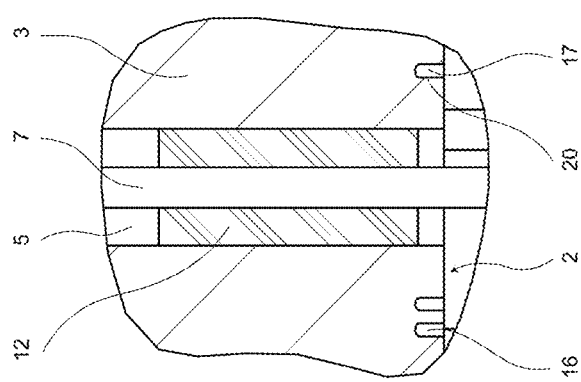
FIG. 6 is a cross-sectional view of the detail A of a fourth preferred embodiment, in which the pressure compensator comprise an annular groove.
Figure 7A:
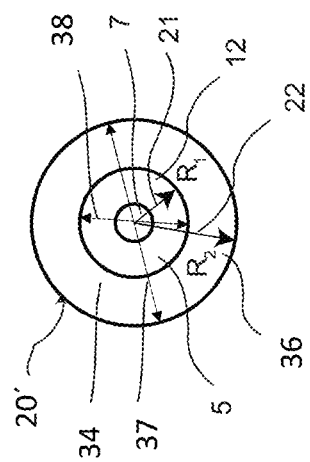
FIG. 7a is a plan view of a feed-through as shown in FIG. 1 and in FIGS. 4 to 6 in a respective preferred embodiment, in the direction of the arrow X in FIG. 1, in which the pressure compensator comprise an annular groove in each case.
Figure 7B:
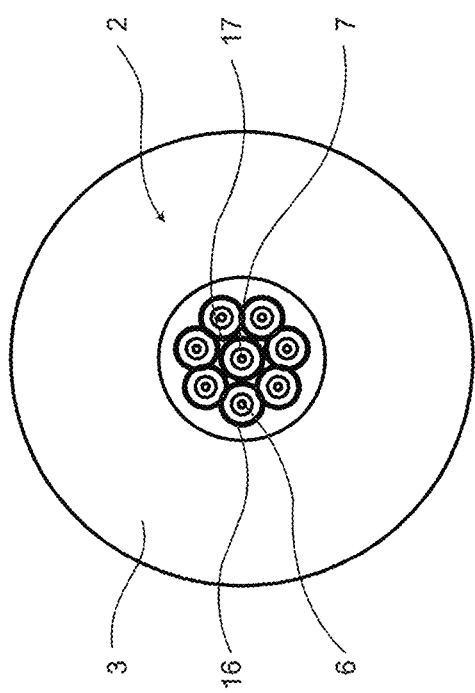
FIG. 7b is a plan view of a functional element of the feed-throughs shown in FIG. 1 and in FIGS. 4 to 6 in a respective preferred embodiment, in the direction of the arrow X in FIG. 1, which moreover shows the annular groove surrounding the functional element.

Now, reference is first made to FIG. 7b which is a plan view of a functional element 7 of the feed-throughs of the respective preferred embodiments shown in FIG. 1 and FIGS. 3 to 6 in the direction of the arrow X of FIG. 1, which also shows the annular groove 17 with its inner surface 20 surrounding the functional element.

In all embodiments of feed-through 1, the respective insulating material 12 extends within the through-hole 4, 5 radially to the edge thereof, which is illustrated by arrow 21 representing this radial extent R1 starting from longitudinal axis 15.

For the diameter of this edge of through-hole 4, 5, and thus for the inner diameter $D_i$ of a protruding portion 30 to 34, and also for the inner diameter of the material located radially inwards behind the groove 16, 17 (i.e. the peripheral wall 36) of the base body 3, the value $D_i = 2*R_1$ is resulting here. In the preferred embodiments of feed-through 1, this diameter $D_i$ also corresponds to the outer diameter of the insulating material 11, 12 within through-hole 4, 5.

Figure 7C:
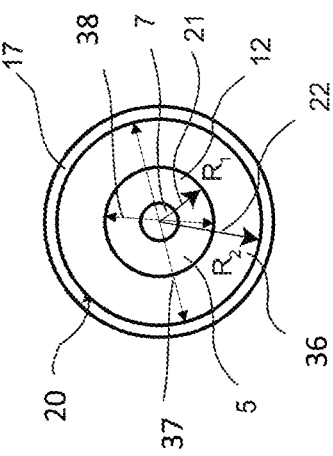
FIG. 7c is a plan view of a functional element of the feed-throughs shown in FIGS. 9 to 13 in a respective preferred embodiment, in the direction of the arrow X in FIG. 1, which moreover shows the protruding portion surrounding the functional element, and in which further parts of the base body of the feed-through are not shown, for the sake of clarity.

In FIGS. 7b and 7c, the diameter $D_i$ is designated by reference numeral 38 in each case, FIG. 7c being a plan view of a functional element of the respective preferred embodiments of the feed-throughs shown in FIGS. 9 to 13 in the direction of the arrow X in FIG. 1, which also shows the protruding portion 34 surrounding the insulating material 12 and an peripheral wall 36 defined thereby.

Arrow 22 illustrates the respective radial extent R2 starting from longitudinal axis 15 to the inner surface 20 of annular groove 17, or starting from longitudinal axis 15 to the outer surface 20' of the protruding portion 30 to 34. For the diameter or outer diameter $D_O$ of the inner surface 20 of annular groove 17 or of the outer surface 20' of protruding portion 30 to 34, a value $D_O = 2*R_2$ is resulting.

In FIGS. 7b and 7c, the diameter $D_O$ is designated by reference numeral 37.

Advantageously, a glass and/or a glass-ceramic material and/or a ceramic material is used for the insulating material 12, in particular also in the embodiment illustrated in FIGS. 7b and 7c, respectively.

Preferably, a compression glass seal is produced with the insulating material 12, and for producing it, the glass or the glass-ceramic material is heated to above its softening or glass transition point Tg to such an extent that the material fuses to both, the base body 3 and the respective functional element 6 to 10 in through-hole 5. During subsequent cooling, the glass or glass-ceramic material solidifies, and due to different thermal expansion coefficients of the material of the base body 3 and of the glass or glass-ceramic material, compressive stresses will arise emanating from the base body 3 and acting on the glass or glass-ceramic material. In this case it is necessary that the respective base body 3 is able to produce such forces generating the compressive stresses, in particular for holding the glass or glass-ceramic material in pressure-resistant manner, and for this purpose the base body must have a specific thickness DG in the portion around the glass or glass-ceramic material.

However, as can be seen from FIG. 7b, this thickness corresponds to the difference between radii R1 and R2, $DG = R_2 - R_1$, and the material of the base body 3 defining this thickness is also referred to as peripheral wall and is designated with reference numeral 36, as already mentioned above. This is the material of the protruding portion 30 to 34 or the material of base body 3 located radially inwardly of groove 20.

In order for a base body 3 made of steel to be able to produce such forces, the inventors have found that this thickness DG should not be less than 1.15*R1, preferably not less than 1.3*R1, and in order for a base body 3 made of stainless steel to be able to produce such forces, this thickness DG should not be less than 1.25*R1, preferably not less than 1.6*R1.

It is assumed, here, that the extent of the insulating material 12 in its longitudinal direction was approximately 5*R1.

For any other described embodiments, both those with and those without pressure compensator as well, this value was also approximately in the range of 5*R1, unless otherwise stated. However, advantageously, values for the extent of the insulating material 12 in the longitudinal direction 14, 15 of the respective through-hole 4, 5 in a range from 1*R1 to 10*R1 are also possible.

For preferred embodiments, the volume of the material between the groove 16, 17 and the insulating material 12 is much smaller than the volume of the material of base body 3 between the groove and the outer edge 40 of feed-through 1. For this comparison of the respective volumes, the volume of peripheral wall 36 to the depth T is considered as "the volume of the material between the groove 16, 17 and the insulating material 12". "The volume of the material of base body 3 between the groove 16, 17 and the outer edge 40 of feed-through 1" is considered to be the volume of the material located in base body 3 between the groove 16, 17 of width Di and radially outwardly as far as to the outer edge 40, see for example FIG. 1, and also to a depth T.

Such embodiments are particularly advantageous if the feed-through is to be welded into further assemblies when being mounted later, since heating of the insulating material 12 during the welding process will only occur to a reduced degree in this case.

For further preferred embodiments, the volume of the material of the protruding portion 30 to 34 is much smaller than the volume of the material of base body 3 between the protruding portion 30 to 34 and the outer edge 40 of the base body 3 of feed-through 1. For this comparison of the respective volumes, the volume of the peripheral wall 36 to the depth T is again considered as "the volume of the protruding portion 30 to 34" in these embodiments. "The volume of the material of base body 3 between the protruding portion 30 to 34 and the outer edge 40 of feed-through 1" is considered to be the volume of the material located in base body 3 starting from the outer surface 20' of the protruding portion 30 to 34 of width Di radially outwardly to the outer edge 40, see for example FIG. 9, and also to a depth T.

These embodiments are also particularly advantageous if the feed-through is to be welded into further assemblies when being mounted later, since heating of the insulating material 12 during the welding process will only occur to a reduced degree in this case.

If the coefficients of thermal expansion of the material of the base body 3 and of the glass or glass-ceramic material are matched with each other, as for example when using Kovar, preferably with alloying fractions of Fe: 54%, Ni: 28%, Co: 18% for the material of the base body and a borosilicate glass for the insulating material 12, then this thickness DG should not be less than 1.1*R1.

This means that the radius of the inner surface 20 of annular groove 17 must not be made arbitrarily small in the case of a compression glass seal, although this might initially appear to be most obvious for the best possible pressure-compensating effect.

Surprisingly, the inventors have found that in case of stainless steel, a radius R2 of the inner surface 20 of 1.7*R1 resulted in a very strong increase in pressure resistance of the feed-through 1 which did burst at 2700 bar, so that it withstood even pressures of 4000 bar after a pressure compensator in the form of the annular groove 17 had been added to an otherwise identical feed-through.

Moreover, the inventors have found that the ratio DO/Di and hence the ratio of radii R2/R1 may advantageously range from 1.05 to 2.

A particularly preferred value for the ratio DO/Di is in the range from less than or equal to 1.6 to greater than or equal to 1.10, and the most preferred value of the ratio DO/Di is in the range from less than or equal to 1.35 to greater than or equal to 1.15. The same applies to the ratio of radii R2/R1.

When the aforementioned values were used for ratio R2/R1 and for ratio DO/Di, it was found that in particular in the high-pressure range, i.e. in a pressure range of more than 1000 bar, compressive forces were exerted on the functional element in the region of the inner surface of the annular groove 20, and in the other embodiments in the region of the outer surface 20' of the protruding portion, which increased the pressure resistance of feed-through 1.

In addition or alternatively to the determination of the leak rate, in particular helium leak rate, a hydrostatic test may be performed, for example using water with a phosphor admixed thereto, by producing the external pressure the feed-through 1 is subjected to with this water. As soon as, while continuing to increase the external pressure generated by the water, the phosphor which passed through the feed-through 1 is recognizable under UV light on the side of the feed-through 1 facing away from the external pressure and in particular behind the insulating material 11, 12, this will be a measure of a no longer sufficient pressure resistance of the feed-through 1 to the then prevailing external pressure.

In the context of the present disclosure, external means that side of the feed-through 1, which faces the respective pressure compensator, hence the side to which the annular grooves 16, 17 or the blind hole-type openings 23 to 29 open, or to which a protruding portion 30 to 34 extends. Consequently, external pressure means a pressure this side of the feed-through 1 is subjected to under operating conditions, hence an externally acting pressure.

This hydrostatic test performed until failure of the feed-through 1 has the advantage that it permits to see how far away one is from the required specification with a safety margin with respect to pressure resistance, and it also allows to reliably determine the distribution of pressure resistance in order to be able to reliably keep to this predefined margin in manufacturing as well.

As far as reference has been made above to an inner surface of an annular groove, this similarly applies to embodiments in which no annular groove is provided, in this case the above statements do not apply to the outer diameter DO of the inner surface 20, but to the outer diameter DO of the outer surface 20' of the protruding portion 30 to 34.

The statements above apply to all disclosed embodiments in which the inner surface 20 has a substantially cylindrical shape and similarly to embodiments in which a frusto-conical instead of a cylindrical shape is given. If in further embodiments the inner surface 20 is inclined relative to the longitudinal axis 15, all existing radii thereof should be at least in the preferred range as specified above.

Generally, R2 should not exceed ten times the value of R1, since above these values the pressure-compensating effect appears to be low. Preferably, R2 is less than or equal to three times the value of R1, and most preferably R2 is less than or equal to twice the value of R1.

By incrementally reducing the radius R2 of the inner surface 20, preferably in material-removing manner, the best possible pressure-compensating effect could be achieved, which was already detectable at a depth of the groove of 1/10 mm and more, wherein depth is understood to mean an extent in a direction in parallel to the longitudinal direction 15 of the through-hole 5 into the material of base body 3.

In this way, it was moreover possible to ensure that the pressure experienced by the material of the base body 3 within the range of operating pressures of the feed-through 1 does not exceed the elastic deformation limit, or yield point, of the material of the base body 3. Range of operating pressure herein is understood to mean a pressure range which reliably remains below the maximum possible pressure that describes the pressure resistance, and hence also takes into account real manufacturing tolerances.

Within the limits mentioned above, no irreversible, in particular no non-elastic deformations were found.

Depending on the dimensioning of the pressure compensator, in particular of the radius R2 of the inner surface 20, the connection between the base body 3 and the functional element 6 to 10, in particular the connection between the insulating material 12 and the base body 3, withstands pressures that are increased by 20%, more preferably by 50%, and most preferably by 100%, compared to a feed-through without pressure compensator, in particular external pressure compensator, and this in fluid-tight manner and regularly also with long-term operation stability.

In summary, it has been found, highly surprisingly, that weakening or reducing the thickness of the material of the base body 3 which surrounds the insulating material 12 that establishes the hermetically sealing connection to the functional element, can result in an increase in pressure resistance of the feed-through 1.

Highly surprisingly, it has moreover been found that this increase in pressure resistance may even range up to a doubling thereof or may even go beyond that.

However, an irreversible deformation as proposed in the prior art does not have to occur in this case, in particular not if materials are used for the base body, which exhibit some elasticity, such as in the case of the metals already mentioned above, for example steel, stainless steel, FeCo alloys, titanium, titanium alloys, aluminum and aluminum alloys, Kovar, or Inconel, for example Inconel 690 and/or Inconel 625.

Materials that are suitable for the functional element, which is also referred to as function element in the context of the present disclosure, as mentioned above, include, besides steel and/or stainless steel, titanium and/or titanium alloys, NiFe alloys, preferably CF25, FeCo alloys, in particular also beryllium-copper alloys, Kovar, CF25, tungsten or Inconel, such as Inconel 690, Inconel 625, Inconel 740, Inconel 740X, Inconel 750, Inconel 750X, and others.

If the ratio DO/Di is closer to the higher values referred to as preferred, more preferred, or most preferred above, then low expansion alloys have proved advantageous for the functional element 6 to 10, including, e.g., NiFe alloys, Kovar, CF25, and tungsten.

If the ratio DO/Di is closer to the lower values referred to as preferred, more preferred, or most preferred above, then high expansion alloys have proved advantageous for the functional element 6 to 10, including, e.g., Inconel 740, Inconel 740X, Inconel 750, and/or Inconel 750X, since in this case the pressure on the functional element 6 to 10 will be lower, in particular in the region facing the exterior of the feed-through 1.

As mentioned above, glass, glass-ceramic material and/or ceramic material is generally suitable as the material for the insulating material 12. Particularly advantageous as a glass is an amorphous material, in particular a multi-component glass. However, equally possible and encompassed by the invention are furthermore quartz materials, e.g. so-called quartz glasses.

Preferred glasses include hard glasses and consequently borosilicate glasses which are also referred to as hard glasses. A preferred glass is the glass G018-385 of Schott AG with Tg at 992° C., for example.

Other preferred materials include glasses which are partially or even completely crystallizable, such as the at least partially crystallized or crystallizable glass including the following oxides, in wt %:

$SiO_2$: 20 to 60, preferably 25 to 50
$Al_2O_3$: 0.5 to 20, preferably 0.5 to 10
CaO: 10 to 50
MgO: 0.5 to 50, preferably 0.5 to 10
$Y_2O_3$: 0.1 to 20, preferably 3 to 20
$ZrO_2$: 0.1 to 25, preferably 3 to 20
$B_2O_3$: 1 to 15, preferably 3 to 12, wherein, furthermore, up to 0.25 wt % of $HfO_2$ may optionally be contained.

According to another embodiment, this at least partially crystallized glass described above is adapted such that the at least one crystal phase comprises a metal oxide with a medium-sized cation and/or advantageously a chain silicate. For the purposes of the present invention, a medium-sized cation is understood to mean a cation which in sixfold, for example octahedral, coordination by oxygen has an ionic radius between 0.5 Å and 0.9 Å. For the purposes of the present disclosure, a metal oxide with a medium-sized cation is preferably understood to mean a metal oxide having a medium-sized cation in the sense of mineral classification according to Strunz, 9th edition. The term medium-sized cation in particular encompasses the tetravalent zirconium ion $Zr^{4+}$.

The term 'chain silicate' refers to those silicates in which the $SiO_4^{4-}$ tetrahedra are corner-linked to form endless ribbons or chains. Examples of such chain silicates include, for example, the pyroxene group of minerals. Another example of a chain silicate is wollastonite.

According to an advantageous embodiment, the metal oxide comprises $ZrO_2$ and preferably additionally yttrium. Particularly preferably, the metal oxide comprises yttrium-stabilized $ZrO_2$, most preferably existent in tetragonal modification.

According to yet another embodiment, the chain silicate comprises $SiO_3^{2-}$ as the silicate unit, and is preferably an earth alkali oxide containing chain silicate.

According to a further preferred embodiment, the earth alkali oxide CaO is comprised in this case, as well as the chain silicate, and furthermore preferably yttrium. For example, the chain silicate may be wollastonite, preferably yttrium-containing wollastonite.

According to yet another embodiment, the chain silicate is a chain silicate comprising earth alkali oxide with pyroxene structure, and the earth alkali oxide preferably comprises CaO and MgO. For example, the chain silicate may be provided in the form of a diopside.

Furthermore, according to one embodiment of the invention it is possible that two different chain silicates are included in the at least partially crystallized glass. For example, the at least partially crystallized glass may include wollastonite or Y-containing wollastonite and diopside. It is likewise possible that one or two chain silicates are contained along with a metal oxide having a medium-sized cation, for example with ZrO2, preferably with Y-doped ZrO2.

The glass-ceramic material comprises in particular an at least partially crystallized glass, a glass, or a glass ceramic, or a glass-based crystallized material, preferably with an electrical resistivity of more than 1.0*1010 □cm at a temperature of 350° C.

Further preferred embodiments will now be described below, first referring to FIGS. 8a and 8b for this purpose.

FIG. 8a shows a plan view of a feed-through according to a further preferred embodiment in a direction corresponding to the direction of the arrow X in FIG. 1, in which the pressure compensator comprise blind hole-type openings in the material of the base body 3, which can only be seen as black dots in this figure and are therefore shown again on an enlarged scale in the detail view of FIG. 8b.

These blind hole-type openings 23 to 29 are preferably arranged symmetrically relative to the respective at least one through-hole 5, 6, in particular with their longitudinal axes on a full circle surrounding the through-hole, on the side 2 of the base body 3 facing the pressure, in particular the external pressure.

FIG. 8b shows a plan view of the functional element 7 of the feed-through 1 shown in FIG. 8a, likewise in the direction corresponding to the direction of the arrow X in FIG. 1, in which the blind hole-type openings 23 to 29 surrounding the functional element can also be seen in the material of the base body 3. These blind hole-type openings 23 to 29 in the material of the base body 3 may be arranged in the base body as pressure compensator as an alternative or in addition to the annular grooves 16, 17 described above, and allow for a laterally closer arrangement of the respective functional elements to each other, in particular also because they may be easier to manufacture in terms of manufacturing technology than intersecting annular grooves.

Furthermore, these annular grooves should not intersect or overlap to an extent so that a desired Dg, i.e. a desired radial extent of the respective material of the base body inside the annular groove of a through-hole is undershot or even reduced thereby, as in the case of intersecting rings, since in this case the pressure resistance of a compression glass seal could be impaired in an undesirable manner. However, this can be avoided by using the blind hole-type openings instead of annular grooves, alternately or in a selective mix together with annular grooves.

The blind hole-type openings in the material of the base body may as well introduce lateral force components, locally, and preferably distributed in predefined manner, which are generated by the pressure, in particular the external pressure, for example in the plane of arrows 18, 19, which can counteract a pressure-induced bending of the base body 3 of feed-through 1. Such blind hole-type openings need not be arranged in the vicinity of through-holes, but may rather be used optimized according to independent design requirements.

Accordingly, the structural design of one embodiment not shown in the figures also comprises an embodiment with at least one blind hole-type opening within a base body, preferably aligned with axial symmetry relative to the functional element, which is capable of providing pressure-compensating effects in the radially outward direction of the functional element.

This blind hole-type opening may also extend to the depth at which the insulating material surrounding the functional element and establishing the fluid-tight connection begins to abut against the functional element, or to that depth which is approximately in the middle of the depth of the insulating material surrounding the functional element and establishing the fluid-tight connection, or else to that depth at which the insulating material surrounding the functional element and establishing the fluid-tight connection stops to abut against the functional element, or may extend beyond that depth at which the insulating material surrounding the functional element and establishing the fluid-tight connection stops to abut against the functional element.

Below, reference will be made to FIGS. 2a and 10a. It can be seen in each case that the insulating material 12 abuts against both the functional element 7 and the base body 3 over a length L which is also referred to as glass seal length.

Figure 2:
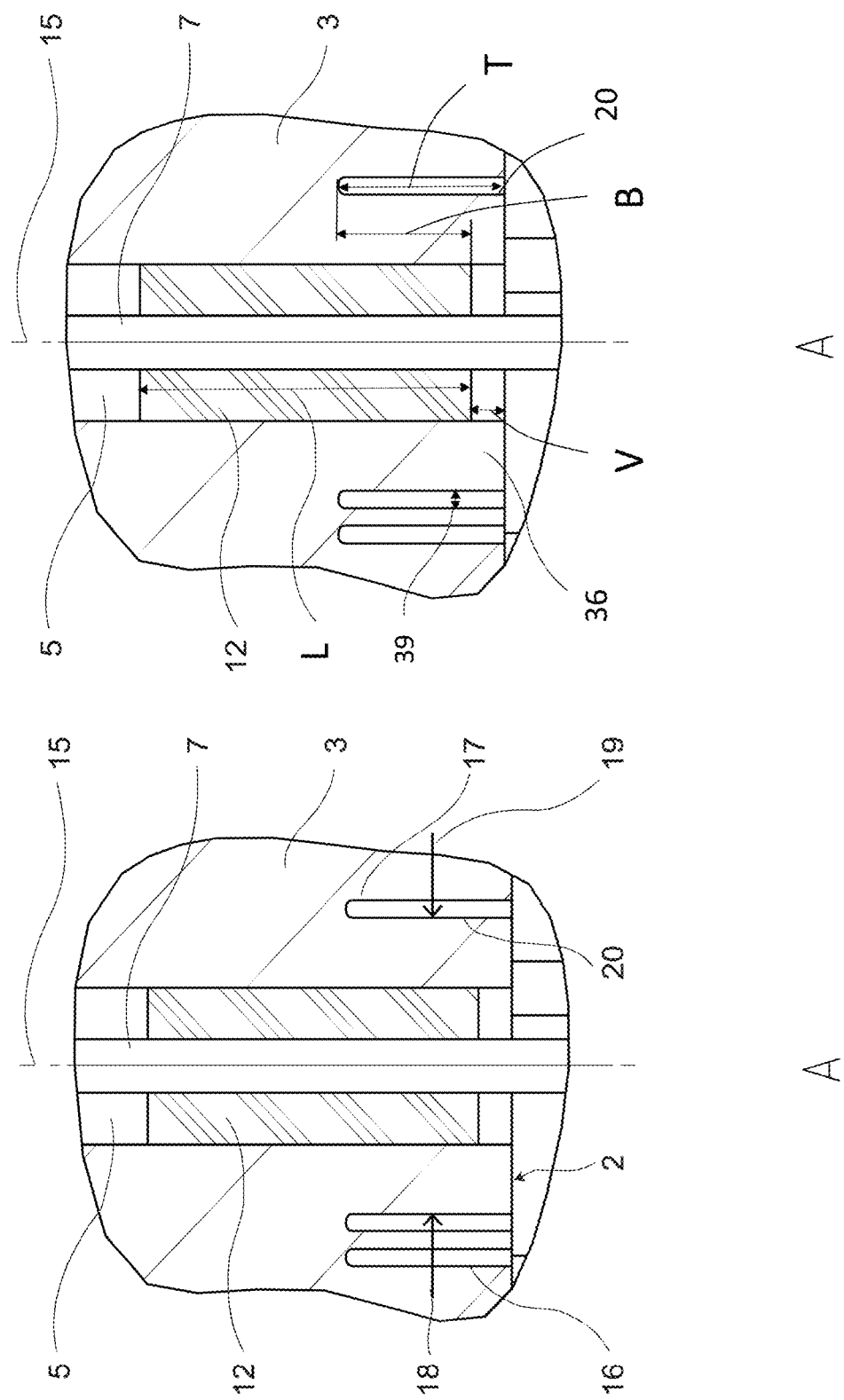
FIG. 2 is a cross-sectional view of the detail A of the first preferred embodiment illustrated in FIG. 1.

In the embodiment illustrated in FIG. 2a, the inner surface 20 of the groove 17 introduced into base body 3 extends to a depth T.

In the embodiment illustrated in FIG. 10a, the outer surface 20' of the protruding portion 32 also extends over a length T in the axial direction, protruding from the side 2 of base body 3 facing the pressure, in particular the external pressure, in the longitudinal direction of through-hole 5.

Since the insulating material 12 is set back in the longitudinal direction of the through-hole 5 by an offset V relative to the side 2 of the base body 3 facing the pressure, in particular the external pressure, the resulting range of overlap B between the glass seal length L and the depth T of the pressure compensator is given by the following equation, as long as B is less than or equal to L:

$$B = T - V.$$

For the embodiments described above, B takes a value of 0%, 50%, and 100% of the length L of the glass seal. Other preferred amounts of this overlap range B are 10%, 15%, 20%, and particularly preferable also 30% of the of glass seal length L.

In particular embodiments, the depth of the groove 17 may be greater than the length L of the glass seal. As a result, there will merely be a thin wall between the groove and the hole. In principle, an undesirable leak might arise if this wall fails. On the other hand, the wall is not supported by the insulating material, e.g. the glass. When pressure is applied from the side of the groove 17 or the protrusion, the wall may experience a constriction, given a suitable choice of the material for the base body. With this deformation behind the insulating material, the latter may advantageously experience mechanical support. For exploiting this effect, materials are in particular eligible for the base body which exhibit tough deformability and/or good tensile strength.

In a preferred embodiment, stainless steel was used for the base body 1, and the depth T of the annular groove 16, 17 was 5 mm, for a glass seal length L of 30 mm. The groove width Wg, which is indicated by a double arrow and designated by reference numeral 39 in FIG. 2a, for example, was 1 mm and was introduced into the base body 1 by spark erosion.

Figure 4:
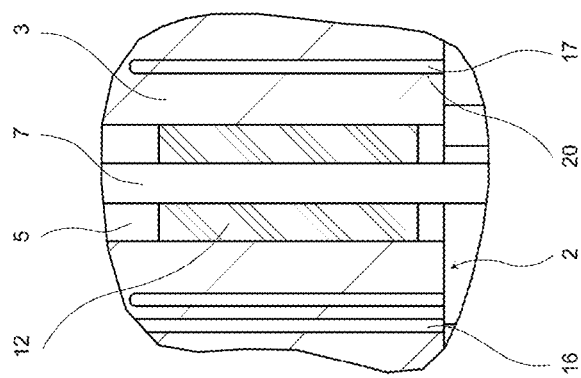
FIG. 4 is a cross-sectional view of the detail A of a second preferred embodiment, in which the pressure compensator comprise an annular groove.

Referring now to FIG. 4 which shows a cross-sectional view of the detail A of FIG. 1 in a second preferred embodiment, in which the pressure compensator likewise comprise a respective annular groove 16, 17, or, in a further embodiment not illustrated in FIG. 4, include blind hole-type openings 23 to 29 in the material of the base body 3.

In contrast to the first preferred embodiment described above, in which the depth of the annular groove 16, 17 or of the blind hole-type opening 23 to 29 extends to the depth approximately in the middle of the depth of the insulating material 12 surrounding the functional element 6, 7 and establishing the fluid-tight connection, the annular grooves 16, 17 are less deep here.

In this second preferred embodiment, the depth of the annular groove 16, 17 or of the blind hole-type opening 23 to 29 only extends to that depth at which the insulating material 12 surrounding the functional element 6, 7 and establishing the fluid-tight connection begins to abut against the base body 3.

In the third preferred embodiment illustrated in FIG. 5, the depth of the annular groove 16, 17 or of the blind hole-type opening 23 to 29 extends to that depth at which the insulating material 12 surrounding the functional element and establishing the fluid-tight connection stops to abut against the base body 3.

In the fourth preferred embodiment illustrated in FIG. 6, the depth of the annular groove 16, 17 or of the blind hole-type opening 23 to 29 extends beyond that depth at which the insulating material 12 surrounding the functional element 6, 7 and establishing the fluid-tight connection stops to abut against the base body 3.

Figure 9:
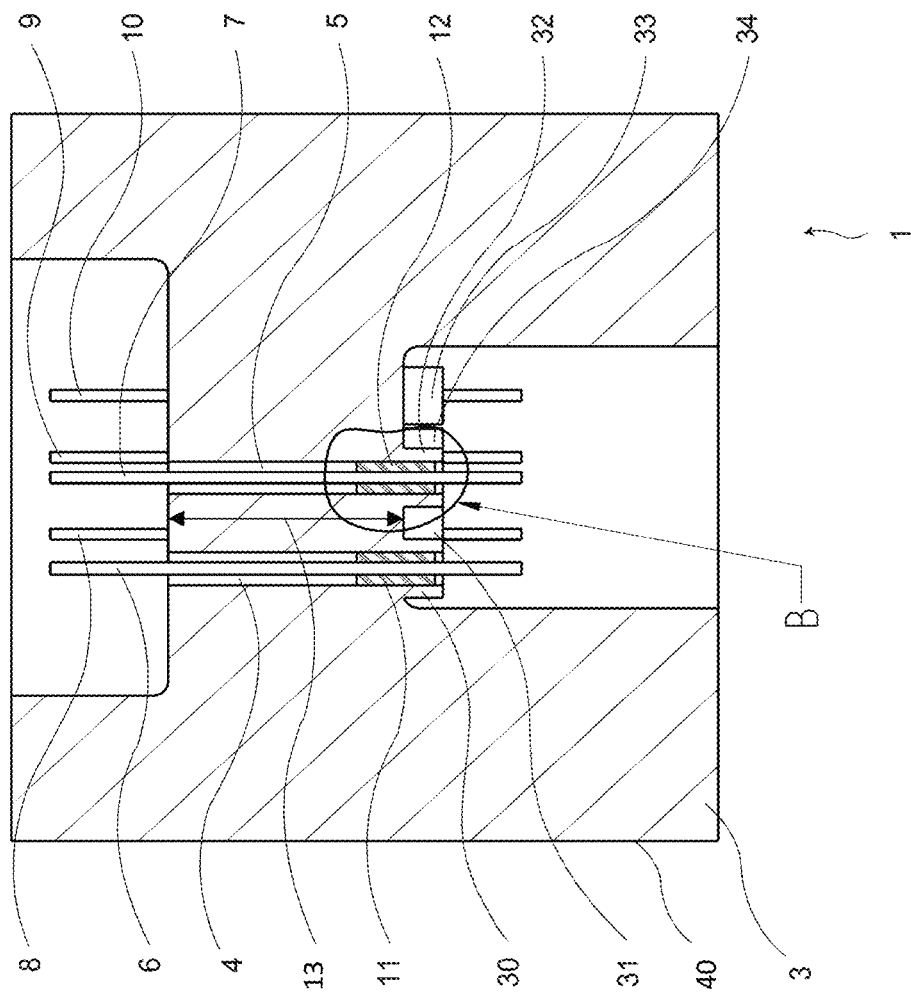

FIG. 9 shows a cross-sectional view of a first preferred embodiment of a feed-through 1 in which the pressure compensator comprise a respective protruding portion 30 to 34 of the base body 3 in the form of a respective annular elevation, with the sectional plane extending approximately perpendicularly through the center of the feed-through 1.

The annular elevations are each formed symmetrically relative to the through-hole 4, 5, on the side 2 of the base body 3 facing the pressure, in particular the external pressure.

In functionally the same way as in the embodiments described above, pressure components resulting by pressure, in particular by the external pressure, are directed perpendicularly to the longitudinal direction 15 of the through-hole 5 to peripheral regions, in the present case to the outer surface 20' of the annular elevation of the protruding portion 32 of the material of base body 3 surrounding the at least one through-hole 5. The direction of the pressure experienced in this case is again illustrated by arrows 18 and 19.

These peripheral regions, i.e. the outer surface 20' of the annular elevation of the protruding portion 32, extend in parallel to the longitudinal axis 15 of the at least one through-hole 5.

The force components of the pressure represented by arrows 18, 19 again counteract the up bending forces of the prevailing pressure in a pressure-compensating manner, as has been described above with reference to the inner surface 20 of the annular groove 17.

Consequently, the dimensioning rules described above with reference to the inner surface 20 of annular groove 17 also apply similarly to the diameter of the outer surface 20' of the respective protruding portion 30 to 34.

Figure 11:
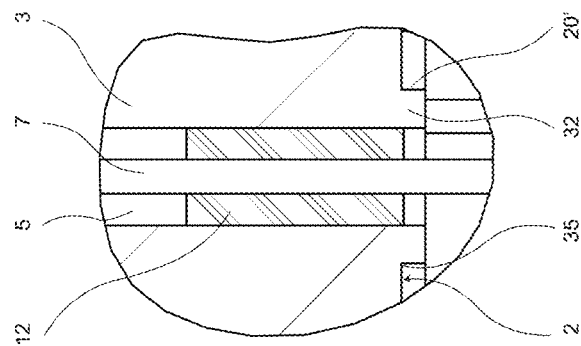
FIG. 11 is a cross-sectional view of the detail B according to a second preferred embodiment.
Figure 12:
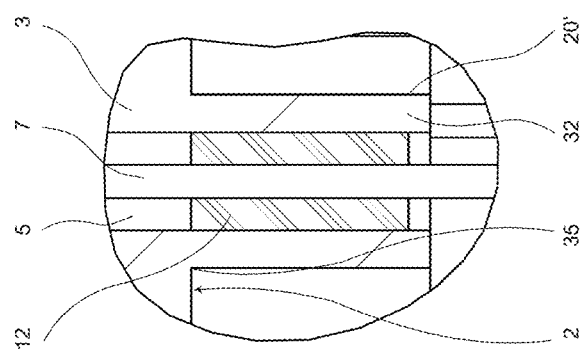
FIG. 12 is a cross-sectional view of the detail B according to a third preferred embodiment.
Figure 13:
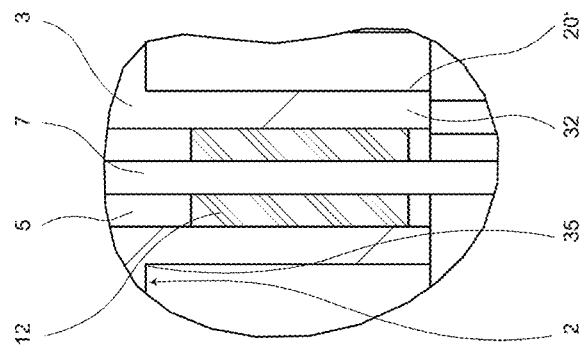
FIG. 13 is a cross-sectional view of the detail B according to a fourth preferred embodiment.

Now, referring to FIG. 10 and additionally also to FIGS. 11, 12, and 13, each of which shows a cross-sectional view of the detail B of FIG. 9 for respective preferred embodiments of a feed-through 1.

FIG. 10 shows the first preferred embodiment in which the end of the protruding portion 32 proximal to the base body ends approximately at half the height of the insulating material 12 preferably establishing the fluid-tight connection on the base body 3. FIG. 11 shows a cross-sectional view of the detail B according to a second preferred embodiment in which the end 35 of the protruding portion 32 proximal to the base body terminates at that level on the base body 3 where the insulating material 12 surrounding the functional element 7 and establishing the fluid-tight connection begins to abut against the base body 3. FIG. 12 shows a cross-sectional view of the detail B according to a third preferred embodiment in which the end 35 of the protruding portion 32 proximal to the base body terminates at that level on the base body 3 where the insulating material 12 surrounding the functional element 7 and establishing the fluid-tight connection stops to abut against the base body 3, and FIG. 13 shows a cross-sectional view of the detail B according to a fourth preferred embodiment in which the end of the protruding portion proximal to the base body terminates lower on the base body than at the point where the insulating material surrounding the functional element and establishing the fluid-tight connection stops to abut against the base body.

FIGS. 14 to 21 show respective different cross-sectional shapes of the protruding portion 32. According to FIG. 14, the end of the protruding portion 32 proximal to the base body 3 is rounded.

According to FIG. 15, the end of the protruding portion 32 proximal to the base body 3 has a frusto-conical shape.

According to FIG. 16, the outer surface 20' has a frusto-conical shape.

According to FIG. 17, the outer surface 20' has a funnel-like shape tapering towards the base body.

According to FIG. 18, the outer surface 20' has a frusto-conical shape, and the end of the protruding portion 32 proximal to the base body 3 is rounded.

According to FIG. 19, the outer surface 20' has a frusto-conical shape, and the end of the protruding portion 32 proximal to the base body 3 also has a frusto-conical shape, but with a different inclination than that of the outer surface 20'.

According to FIG. 20, the outer surface 20' has a funnel-like shape tapering towards the base body, and the end of the protruding portion 32 proximal to the base body 3 is rounded.

According to FIG. 21, the outer surface 20' has a funnel-like shape tapering towards the base body, and the end of the protruding portion 32 proximal to the base body 3 has a frusto-conical shape.

The inner wall 20 of the annular groove 17 may have a similar shape as described above, with a functionally equivalent effect.

As the thickness Dg varies with the depth, it is furthermore possible to selectively produce different pressure-compensating effects at different depths adapted to the respective application.

In a preferred embodiment, the functional element 6, 7 described above may comprise an electrical conductor.

The annular grooves and/or blind hole-type openings described above may as well be filled with a sealing compound, preferably an elastic sealing compound comprising an elastic material, in particular a polymer, a silicone compound, and/or a rubber, in order to prevent them from being soiled or chemically attacked by environmental influences occurring in the field.

The feed-through of the invention has the advantage, due to its operating principle involving the pressure compensator, that when an external pressure is applied, a clamping force produced by the applied pressure is exerted on the insulating element and/or on the functional element, which significantly improves the pressure stability of the feedthrough.

What is claimed is:

1. A lead-through for high external pressure applications, comprising:
    a base body; and
    a through-hole extending through the base body along a longitudinal axis;
    a functional element arranged inside the through-hole, wherein the functional element is connected to the base body by an insulating material to form a fluid-tight connection, wherein the insulating material extends radially in the through-hole up to an edge thereof and defines a first radial extent (R1) from the longitudinal axis to the edge, wherein the insulating material is set back in the longitudinal direction of the through-hole by an offset relative to a side of the base body facing external pressure; and
    a pressure compensator arranged in the base body around the through-hole and the offset at the side facing the external pressure, the pressure compensator having a second radial extent (R2) from the longitudinal axis to a diameter of the pressure compensator, the second radial extent (R2) not exceeding ten times the first radial extent (R1),
    wherein the pressure compensator applies, as a result of the external pressure on the pressure compensator, an additional pressure on the insulating material in a direction perpendicular to the longitudinal direction so as to increase pressure resistance of the fluid-tight connection.

2. The lead-through of claim 1, wherein the pressure compensator is arranged in the base body symmetrically around the through-hole.

3. The lead-through of claim 1, wherein the pressure compensator comprises an annular groove.

4. The lead-through of claim 3, wherein the annular groove has a depth in the base body equal to a depth of the insulation material.

5. The lead-through of claim 3, wherein the annular groove has a depth in the base body beyond a depth of the insulation material.

6. The lead-through of claim 3, wherein the annular groove has a depth in the base body equal to a middle of a depth of the insulation material.

7. The lead-through of claim 3, wherein the annular groove has a non-rectangular cross-sectional shape.

8. The lead-through of claim 7, wherein the non-rectangular cross-sectional shape is a frusto-conical cross-sectional shape.

9. The lead-through of claim 1, wherein the pressure compensator comprises an annular protruding portion.

10. The lead-through of claim 9, wherein the annular protruding portion terminates level to the base body where the insulating material surrounds the functional element.

11. The lead-through of claim 9, wherein the annular protruding portion terminates lower than the base body where the insulating material surrounds the functional element.

12. The lead-through of claim 9, wherein the annular protruding portion terminates level to or lower than the base body where the insulating material surrounds the functional element.

13. The lead-through of claim 9, wherein the annular protruding portion terminates at half a height of the insulating material.

14. The lead-through of claim 9, wherein the annular protrusion has a non-rectangular cross-sectional shape.

15. The lead-through of claim 14, wherein the non-rectangular cross-sectional shape is a frusto-conical cross-sectional shape.

16. The lead-through of claim 1, wherein the pressure compensator comprises a plurality of blind holes in the base body along the longitudinal axis arranged in a full circle surrounding the through-hole.

17. The lead-through of claim 16, wherein the plurality of blind holes each have a depth in the base body equal to a depth of the insulation material.

18. The lead-through of claim 16, wherein the plurality of blind holes each have a depth in the base body beyond a depth of the insulation material.

19. The lead-through of claim 16, wherein the plurality of blind holes each have a depth in the base body equal to a middle of a depth of the insulation material.

20. The lead-through of claim 16, wherein the plurality of blind holes extend obliquely with respect to the longitudinal axis.

21. The lead-through of claim 1, wherein the functional element comprises an electrical conductor.

22. The lead-through of claim 1, wherein the insulating material comprises a material selected from the group consisting of glass, glass-ceramic, and ceramic.

23. The lead-through of claim 1, wherein the base body comprises a material selected from the group consisting of steel, stainless steel, FeCo alloy, titanium, titanium alloy, aluminum, aluminum alloy, Kovar, Inconel, Inconel 690, Inconel 625, Inconel 740, Inconel 740X, Inconel 750, and Inconel 750X.

24. The lead-through of claim 1, wherein the functional element comprises a material selected from the group consisting of steel, stainless steel, FeCo alloy, titanium, titanium alloy, aluminum, aluminum alloy, NiFe alloy, CF25, FeCo alloy, beryllium-copper alloy, Kovar, tungsten, Inconel, Inconel 690, Inconel 625, Inconel 740, Inconel 740X, Inconel 750, and Inconel 750X.

25. The lead-through of claim 1, wherein the fluid-tight connection withstands in fluid-tight manner operating pressures that are increased by 10% compared to a lead-through without the pressure compensator.

26. The lead-through of claim 1, wherein the diameter of the pressure compensator comprises a first outer diameter (DO) and the through hole has a second outer diameter (Di), wherein a ratio DO/Di has a value ranging from less than or equal to 2 to greater than or equal to 1.05.

27. The lead-through of claim 1, wherein the offset extends deeper into the base body than the pressure compensator.

28. A method for producing a lead-through for high external pressure applications, comprising:
    providing a base body with a through-hole extending through the base body along a longitudinal axis and a pressure compensator around the through-hole at a side facing the external pressure; and
    sealing a functional element inside the through-hole with an insulating material to form a fluid-tight connection, the insulating material extending radially in the through-hole up to an edge thereof and defines a first radial extent (R1) from the longitudinal axis to the edge, the insulating material being set back along the longitudinal axis by an offset relative to the side of the base body facing the external pressure so that the pressure compensator is arranged around the offset, the pressure compensator having a second radial extent (R2) from the longitudinal axis to a diameter of the pressure compensator, the second radial extent (R2) not exceeding ten times the first radial extent (R1).

29. The method for of claim 28, wherein the step of providing the base body further comprises providing the pressure compensator in a shape selected from a group consisting of: an annular groove, a plurality of blind holes, and an annular protruding portion.

30. A lead-through for high external pressure applications, comprising:
   a base body; and
   a through-hole extending through the base body along a longitudinal axis;
   a functional element arranged inside the through-hole, wherein the functional element is connected to the base body by an insulating material to form a fluid-tight connection, wherein the insulating material extends radially in the through-hole up to an edge thereof and defines a first radial extent (R1) from the longitudinal axis to the edge; and
   a pressure compensator arranged in the base body around the through-hole at a side facing the external pressure, the pressure compensator having a second radial extent (R2) from the longitudinal axis to a diameter of the pressure compensator, the second radial extent (R2) not exceeding ten times the first radial extent (R1), the pressure compensators extending obliquely with respect to the longitudinal axis,
   wherein the pressure compensator applies, as a result of the external pressure on the pressure compensator, an additional pressure on the insulating material in a direction perpendicular to the longitudinal direction so as to increase pressure resistance of the fluid-tight connection.

31. The lead-through of claim 30, wherein the pressure compensator is in a shape selected from a group consisting of: an annular groove, a plurality of blind holes, and an annular protruding portion.

\* \* \* \* \*